March 10, 1936.  J. KOPETZ  2,033,717
DEVICE FOR MAKING FLEXIBLE TUBING FROM STRIP MATERIAL
Filed Sept. 29, 1934  3 Sheets-Sheet 1

March 10, 1936.    J. KOPETZ    2,033,717
DEVICE FOR MAKING FLEXIBLE TUBING FROM STRIP MATERIAL
Filed Sept. 29, 1934    3 Sheets—Sheet 2
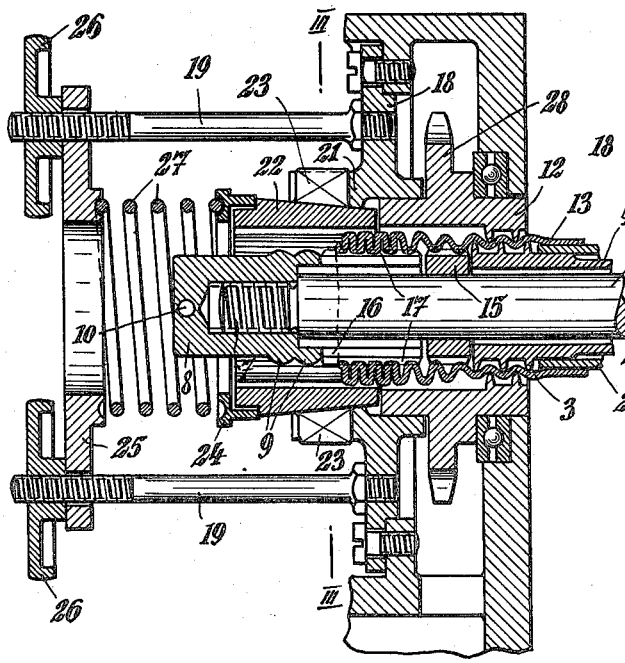
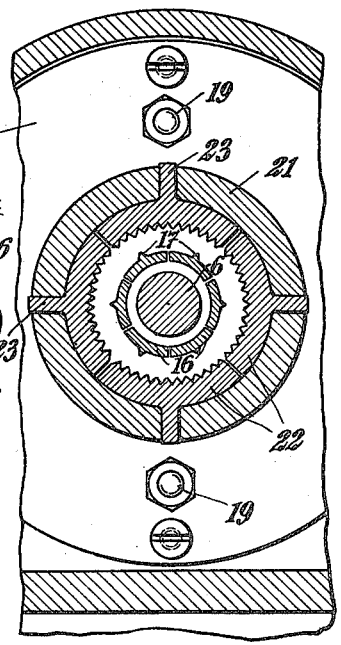
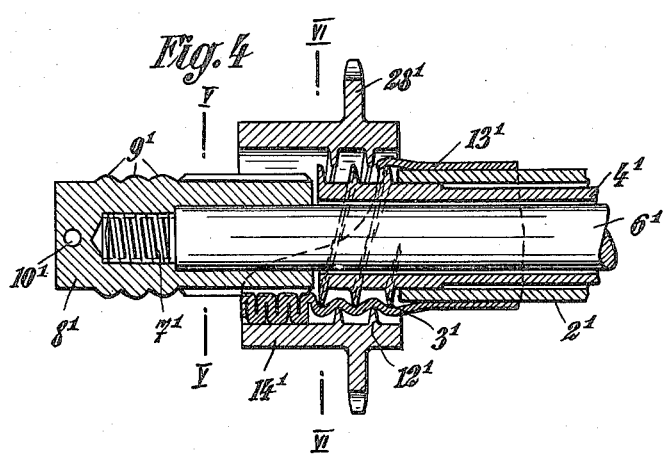
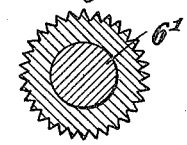
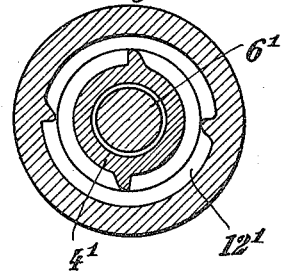
Inventor,
Josef Kopetz,
by Frank S. Appleman,
attorney.

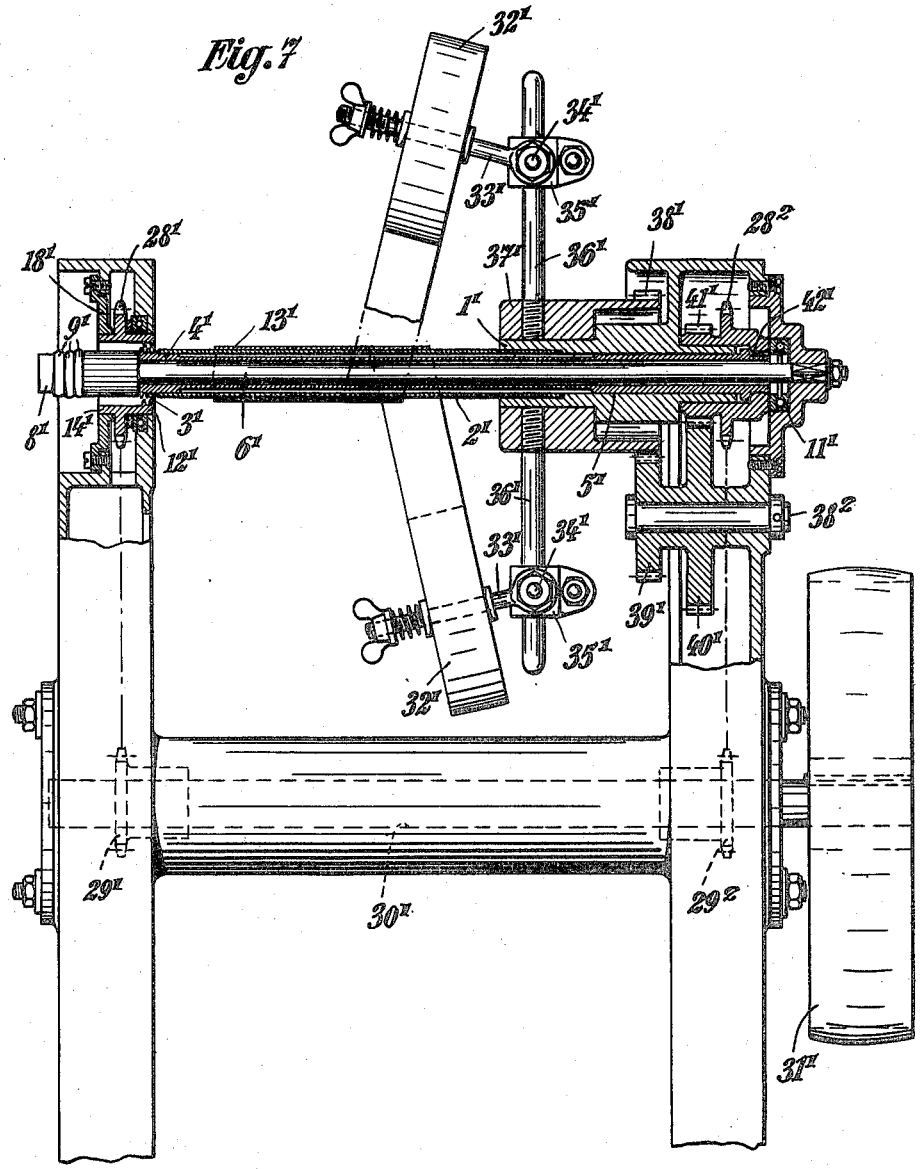

Patented Mar. 10, 1936

2,033,717

UNITED STATES PATENT OFFICE 2,033,717

DEVICE FOR MAKING FLEXIBLE TUBING FROM STRIP MATERIAL

Josef Kopetz, Vienna, Austria

Application September 29, 1934, Serial No. 746,185
In Austria July 7, 1933

9 Claims. (Cl. 93—80)

This invention relates to a device for the manufacturing of helically grooved hose pipe or tubing from strip material which is wrapped upon a fixed mandrel, and to which helical grooves are imparted by an internally screw threaded socket which also serves to withdraw the formed tubing from the mandrel. It is already known to compress the tubing longitudinally as it leaves the socket, until the helical turns thereof are crowded up into close contact with each other, thereby increasing the strength and at the same time also the flexibility of the tubing, and in addition effecting an improvement on its previously corrugated shape. For this purpose the tubing has hitherto been passed from the above-mentioned threaded socket directly through a smooth walled annular passage and prevented from itself turning, during the compressing stage, by a suitable shaping and arrangement of the wrapped mandrels or by clamping rollers disposed about the same, which means have not, however, proved sufficiently effective for the purpose intended.

The present invention has for its object to provide more reliable securing of the tubing against rotation, and that by means of the member which effects the longitudinal compressing of the tubing, and consists essentially in the arrangement that a member disposed immediately beyond the screw threaded grooving and withdrawing socket, and locked against rotation and longitudinal displacement, is serrated in its length and adapted to compress the tubing longitudinally by friction, while securing the same reliably against simultaneous rotation. In accordance with the invention a central shaft traversing lengthwise the hollow thread-ended spindle disposed within the fixed wrapped mandrel is fixed and provided at its end projecting from the screw threaded grooving socket with a collar having longitudinal serrations on its peripheral surface. In addition to this collar there is provided a resilient, longitudinally serrated sheath which embraces the grooved tubing, and serves to prevent undesirable straining of the implements provided for the shaping of the tubing and of the finished tubing itself. In further development of the invention, this sheath may consist of a divided or slotted sleeve which is externally tapered, locked against rotation, guided in a tapered ring, and subjected to spring action. The invention further includes constructional features and details which contribute to the ensuring of continuous and undisturbed production of the flexible tubing.

Two forms of construction embodying the invention are shown, by way of example, in the accompanying drawings, in which:

Fig. 2 shows on an enlarged scale a longitudinal section taken through the parts of the device which serve for the shaping of the tubing.

Fig. 3 is a transverse section taken on the line III—III of Fig. 2.

Fig. 4 is a longitudinal section taken through the tube forming parts of a simplified form of construction of the device according to the invention.

Figs. 5 and 6 are cross sections taken on the lines V—V and VI—VI, respectively, of Fig. 4.

Figure 7 shows the complete design of a machine according to the simplified form of construction in Figure 4, partly in longitudinal section.

Figure 1:
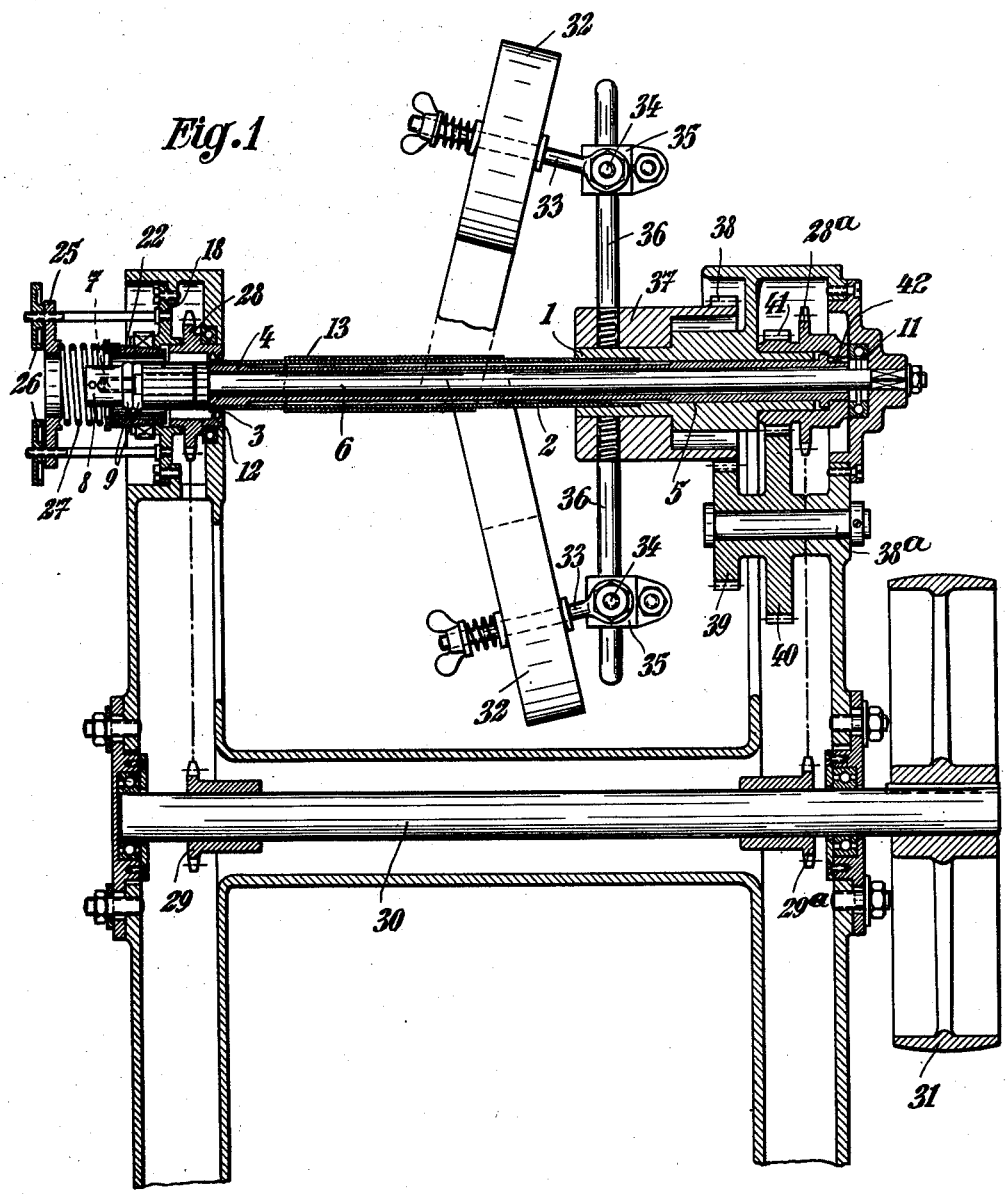
Fig. 1 shows the one form of construction in longitudinal section.

Referring to the drawings, in which the same parts are denoted by the same reference numerals throughout, the hollow wrapping mandrel 2 which is fixedly mounted at 1 in the framework of the machine, is traversed throughout its length by the hollow spindle 4 which is provided with a screw threaded head 3, and which is journalled at the head end, behind the threaded portion 3, in the hollow mandrel 2, and at the other end in the framework of the machine at 5. Within the hollow spindle 4 there is provided a fixed shaft 6 which is mounted at one end in the framework of the machine, and the forward end of which projects beyond the threaded portion 3 of the hollow spindle 4 and terminates in a threaded pin 7. To this threaded pin 7 there is screwed a cap which forms a collar 8 on the shaft 6, and which takes the form, as to the part in engagement with the shaft 6 of an unsupported longitudinally slotted sleeve 16 (Fig. 2). The individual sections of this sleeve form resilient fingers and are provided with serrations 17. Adjoining the longitudinal serrations on the collar 8 there are provided a plurality of beadings or circumferential corrugations 9. A hole 10 is provided at the outer end of the cap 8 for engagement by a tool for screwing the same onto and off the end of the shaft 6. To prevent axial movement, the hollow spindle 4 is mounted in the framework of the machine by means of a thrust bearing 11. The outside diameter of the threaded portion 3 is somewhat larger than the diameter of the wrapping mandrel 2, so that the tubing 13 is expanded on entering the threaded grooving socket for the purpose of facilitating the withdrawing action.

To the framework of the machine there is secured a flange 18 in which there is mounted the nut 12 constituting the outside portion of the threaded grooving socket. This nut is driven, in common with the hollow spindle 4, through similarly sized chain driving gear elements 28, 29, and 28a, 29a. The chain sprocket wheels 29, 29a are fast on a shaft 30 on which there is mounted a belt driving pulley 31. The chain wheel or sprocket 28a is secured on the hollow spindle 4 by a key 42. On the flange 18 there is provided a sleeve 21 which possesses on the inside a conical seating surface which is tapered in towards the flange 18. In this sleeve there are guided the conical cheeks 22 of a tubular clamping chuck which are longitudinally serrated on the inside and locked against rotation by means of ribs 23 engaging in slots in the sleeve 21. The internal diameter of this chuck is somewhat smaller than the core diameter of the threaded nut 12. The cheeks 22 are off-set at the ends projecting from the sleeve 21, for the application of a ring 24. Upon stay-bolts 19 attached to the flange 18 there is guided a gland 25 the distance of which from the ring 24 is capable of being regulated by means of nuts 26. A helical spring 27 is interposed between the ring 24 and the gland 25.

The means for the formation of a smooth basic stock tube 13 on the wrapping mandrel 2, for subsequent grooving by the threaded grooving socket, consists in the usual manner of two or more supply spools or reels 32 mounted on arms 33 which are tiltable about pivot pins 34 pertaining to sliding members 35. These sliding members 35 are adapted to be fixed in any required position on spoke-like pins 36 screwed into a boss 37 mounted in the framework of the machine. The boss 37 is provided with a toothed rim 38 which is driven from a toothed wheel 41 connected with the chain sprocket wheel 28a, through a pair of gear wheels 39, 40 mounted on a stub shaft 38a pertaining to the framework of the machine.

The tubing 13 formed by the wrapping of strip material upon the mandrel 2 is helically grooved by the screw threaded socket, and is then held fast against rotation and longitudinally compressed by travelling on to the collar 15. The collar 15 is fixed on the hollow spindle 4 in any desired manner such as by a key, set screw, welding, shrinking or it may even be formed integrally with the spindle. The final crowding together of the turns of the tubing is effected between the cheeks 22 and the sleeve 16. If variations in the wall-thickness of the tubing should occur as a result of irregular winding or of variations in the thickness of the strip material used, the chuck is capable of yielding resiliently against the action of the spring 27, with the result that the pressure against the tubing remains constant. The resiliency of the chuck can be adapted to the hardness of the strip material used, by adjustment of the tension of the spring 27 by means of the nuts 26. The sleeve 16 is likewise capable of yielding to an increase of pressure.

A simplified form of construction of the device according to the invention, which is particularly suitable for the manufacturing of tubing of smaller diameter, is shown in Fig. 4 of the drawings. Except for the omission of the collar 22 and its associated parts and for a slight change in the member 8, this modified form is identical with that previously described. The parts corresponding to similar parts in the other figures of the drawings are denoted by the same reference characters as in the other figures except that the reference characters in this form are distinguished by the addition of a prime as an exponent. It is accordingly not deemed necessary to repeat the general description of the form shown in Fig. 1 but only to describe those parts which differ from parts shown in that figure or concern such parts directly. As to its portion provided over its entire circumference (Fig. 5) with longitudinal serrations, the cap 8' is mounted directly upon the shaft 6'. There are two or more turns of screw threading on the end of the hollow spindle 4' and on the co-acting sleeve 12', so that the tubing is gripped in each cross-section at two or more symmetrically disposed points and therefore uniformly withdrawn without bias. For the same reason, the threading on the spindle and in the sleeve end flush with each other, that is to say in one plane, as can be seen in the upper portion of the longitudinal section and in Fig. 6. The sleeve 12' is provided with an extension 14' of angular section, the inside diameter of which is equal to or larger than the diameter of the sleeve at the base of the screw threads. As will be seen, the sleeve 22 embracing the tubing from the outside can be dispensed with in this form of construction. The tubing 13', after having been grooved in a known manner by the threaded grooving socket, travels, on leaving the latter, onto the collar 8', and is checked in its forward movement by the engagement of longitudinal serrations and at the same time securely held against rotation. The helical turns of the tubing become crowded up into close contact with each other, after which the impressions made by the longitudinal serrations on the collar 8' in the inside of the tubing are smoothed out by the action of the beaded or corrugated end portion 9' of this collar. At the same time the extension 14' on the sleeve 12' smoothes the outside of the tubing, so that in the finished state the latter is substantially smooth both outside and inside.

The elements are shown in the same relation in Figure 7 as they are shown in Figure 1 except as to the modified structural features. The element 1', mandrel 2', threaded portion 3', spindle 4', element 5', shaft 6', collar 8', corrugations 9', hole 10', bearing 11', sleeve 12', tubing 13', extension 14', flanges 18', gear element 28a', gear elements 29', 29a', shaft 30', pulley 31', reels 32', arms 33', pins 34', sliding members 35', pins 36', boss 37', rim 38', shaft 38a', wheels 39' and 40', wheel 41', and key 42' correspond to the elements having numbers with the primes omitted as illustrated in Figure 1 and operate in the same manner, except as to the modified features disclosed in connection with the illustration and description of Figure 4.

I claim:

1. A device for the production of helically grooved flexible tubing from strip material comprising a fixed wrapping mandrel, means for wrapping strip material thereon, a hollow spindle rotatably mounted in the said mandrel, and having its forward end projecting from the said mandrel, screw threading on the said projecting end, a nut surrounding the said screw threaded projecting end, means for rotating the said spindle and nut at the same speed and in the same direction, a fixed shaft longitudinally traversing the said spindle and projecting beyond the said threaded end thereof, and an exteriorly longitudinally serrated collar on the projecting end of the said shaft, substantially as and for the purpose specified.

2. A device for the production of helically grooved flexible tubing from strip material, comprising a fixed wrapping mandrel, means for wrapping strip material thereon, a hollow spindle rotatably mounted in the said mandrel and having its forward end projecting from the end of the said mandrel, screw threading on the said projecting end, a nut surrounding the said screw threaded projecting end, means for rotating the said spindle and nut at the same speed and in the same direction, a fixed shaft longitudinally traversing the said spindle and projecting beyond the said threaded end thereof, and an exteriorly longitudinally serrated sleeve on the projecting end of the said shaft, substantially as and for the purpose specified.

3. A device for the production of helically grooved flexible tubing from strip material, comprising a fixed wrapping mandrel, means for wrapping strip material thereon, a screw threaded socket for the helical grooving of the tubing formed from the said strip material, a member situated beyond the said screw threaded socket in the direction of movement of the said tubing, locked against rotation, and consisting of a longitudinally divided sleeve interiorly longitudinally serrated and of tapered outside shape, an internally tapered ring adapted to serve as a guide for the said sleeve, a spring adapted to press the said tapered parts into engagement with each other, and means for locking the said sleeve against rotation.

4. A device as claimed in claim 3, further comprising means for regulating the tension of the said spring.

5. A device as claimed in claim 1, further comprising a ring provided on the said nut and coaxial to the said collar, for the purpose of smoothing the outside of the tubing.

6. A device as claimed in claim 1 in which the outside diameter of the threaded portion of said hollow spindle is larger than that of the said mandrel.

7. In a device as claimed in claim 1 a beaded extension on the said collar for smoothing out the longitudinal grooves in the inside of the tubing produced by the longitudinal serrations on the said collar.

8. The device of claim 1 characterized by having a socket surrounding the projecting end of the spindle and provided with a plural internal thread coacting with the threads on said projecting end, said threads terminating in the same plane.

9. A device for the production of helically grooved flexible tubing from strip material comprising a fixed wrapping mandrel, means for wrapping strip material thereon, a screw threaded socket for the helical grooving of the tubing formed from the strip material, means adapted to rotate with the said screw threaded socket for the purpose of smoothing the outside of the said tubing, a member situated beyond the said screw threaded socket in the direction of movement of the said tubing, means for locking the said member against rotation, and longitudinal serrations on the said member for the purpose of retaining the said tubing from rotating and of compressing the helical corrugations of the said tubing by virtue of increased resistance to forward feed movement.

JOSEF KOPETZ.